(12) United States Patent
Wang et al.

(10) Patent No.: US 11,300,833 B1
(45) Date of Patent: Apr. 12, 2022

(54) POLARIZATION SENSITIVE OPTICAL DIFFUSER

(71) Applicant: Facebook Technologies, LLC, Menlo Park, CA (US)

(72) Inventors: Mengfei Wang, Seattle, WA (US); Gang Li, Bothell, WA (US); Lu Lu, Kirkland, WA (US); Yunqi Li, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 181 days.

(21) Appl. No.: 16/714,430

(22) Filed: Dec. 13, 2019

Related U.S. Application Data

(60) Provisional application No. 62/902,831, filed on Sep. 19, 2019, provisional application No. 62/902,823, filed on Sep. 19, 2019.

(51) Int. Cl.
*G02B 5/02* (2006.01)
*G02F 1/13357* (2006.01)
*G02B 27/01* (2006.01)

(52) U.S. Cl.
CPC ....... *G02F 1/13362* (2013.01); *G02B 5/0278* (2013.01); *G02B 27/0172* (2013.01); *G02B 2027/0174* (2013.01); *G02B 2027/0178* (2013.01)

(58) Field of Classification Search
CPC .... G02B 27/0172; G02B 5/0278; G02B 5/02; G02B 5/00; G02B 2027/0174; G02B 2027/0178; G02F 1/13362; G02F 1/1335; G02F 1/133528; G02F 1/133504; G02F 1/133606

USPC ..................................................... 359/487.06
See application file for complete search history.

(56) References Cited

U.S. PATENT DOCUMENTS

| | | | |
|---|---|---|---|
| 11,016,226 B2 * | 5/2021 | Wang ................... | G02B 27/286 |
| 2006/0181769 A1 | 8/2006 | Kumasawa et al. | |
| 2006/0257586 A1 * | 11/2006 | Umeya ................... | C09K 19/02 428/1.1 |
| 2008/0252974 A1 * | 10/2008 | Futamura .......... | G02F 1/133528 359/487.06 |
| 2010/0103335 A1 * | 4/2010 | Bastiaansen ......... | C09D 11/101 349/18 |
| 2013/0120814 A1 * | 5/2013 | Arai ..................... | G03H 1/0011 359/11 |

(Continued)

OTHER PUBLICATIONS

International Search Report and Written Opinion for International Application No. PCT/US2020/045539, dated Oct. 20, 2020, 9 Pages.

(Continued)

*Primary Examiner* — William R Alexander
(74) *Attorney, Agent, or Firm* — Morgan, Lewis & Bockius LLP

(57) ABSTRACT

An optical diffuser includes optically anisotropic molecules arranged in a predefined configuration such that the optical diffuser diffuses first light having a first polarization and transmits second light having a second polarization that is different from the first polarization upon receiving the second light. In addition to polarization selectivity, the optical diffuser may also exhibit wavelength selectivity and/or incident angle selectivity. A method of diffusing light using the optical diffuser and a method of making the optical diffuser are also disclosed.

19 Claims, 11 Drawing Sheets

(56) References Cited

U.S. PATENT DOCUMENTS

2021/0080725 A1* 3/2021 Sulai .................. G02B 27/0176

OTHER PUBLICATIONS

Lu L.U., et al., "Liquid Crystal Technology for Solving Key Optical Challenges in Virtual and Augmented Realities," S I O International Symposium. Digest of Technical Papers, May 29, 2019, vol. 50 (1), pp. 826-829.
Moon S., et al., "Layered Display with Accommodation Cue Using Scattering Polarizers," IEEE Journal of Selected Topics in Signal Processing, IEEE, US, Oct. 23, 2017, vol. 11 (7), pp. 1223-1231.
Tan G., et al., "Polarization-Multiplexed Multiplane Display," Optics Letters, Nov. 15, 2018, vol. 43 (22), pp. 5651-5654.
Wang, Office Action, U.S. Appl. No. 16/714,441, dated Dec. 8, 2020, 7 pgs.
Wang, Notice of Allowance, U.S. Appl. No. 16/714,441, dated Mar. 8, 2021, 8 pgs.

* cited by examiner

POLARIZATION SENSITIVE OPTICAL DIFFUSER

RELATED APPLICATIONS

This application claims the benefit of, and priority to, U.S. Provisional Patent Application Ser. No. 62/902,823, filed Sep. 19, 2019 and U.S. Provisional Patent Application Ser. No. 62/902,831, filed Sep. 19, 2019, each of which is incorporated by reference herein in its entirety.

This application is related to U.S. patent application Ser. No. 16/714,441, entitled "Varifocal Polarization Sensitive Diffusive Display," filed Dec. 13, 2019, which claims priority to U.S. Provisional Patent Application Ser. No. 62/902,831, filed Sep. 19, 2019 and U.S. Provisional Patent Application Ser. No. 62/902,823, filed Sep. 19, 2019, each of which is incorporated by reference herein in their entireties.

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, head-mounted display devices are used for virtual reality and augmented reality (AR) operations.

When using head-mounted display devices in AR applications, it is important for the head-mounted display devices to be capable of creating cohesive AR scenes by seamlessly transmitting ambient light to a user's eyes while projecting images to the user's eyes.

SUMMARY

Accordingly, there is a need for a head-mounted display device that can transmit both ambient light and project image light to a user's eyes. Certain embodiments of the present disclosure provide optical diffusers that are configurable to transmit ambient light and diffuse image light. In some embodiments, the ambient light is transmitted to the user without significant aberrations or distortions. Thus, the optical diffusers is suitable for use in head-mounted displays to facilitate AR applications.

Thus, the above deficiencies and other problems associated with head-mounted displays are reduced or eliminated by the disclosed optical diffusers.

In accordance with some embodiments, an optical diffuser includes optically anisotropic molecules arranged in a predefined configuration such that the optical diffuser outputs diffuse light upon receiving first light having a first polarization, and transmits second light having a second polarization that is different from the first polarization upon receiving the second light.

In accordance with some embodiments, an optical diffuser includes a first surface, a second surface opposite to the first surface, and optically anisotropic molecules disposed between the first surface and the second surface. The optically anisotropic molecules are arranged such that the optical diffuser outputs diffuse light upon receiving first light having a first polarization, and transmits second light having a second polarization that is different from the first polarization.

In accordance with some embodiments, a method of diffusing light includes receiving incident light at an optical diffuser that includes optically anisotropic molecules arranged in a predefined configuration and outputting diffuse light from the optical diffuser on response to receiving the incident light when the incident light has a first set of properties. The first set of properties includes a first polarization. The method also includes transmitting the incident light in response to receiving the incident light when the incident light has a second set of properties. The second set of properties includes a second polarization that is different from the first polarization In accordance with some embodiments, a method of diffusing light includes receiving incident light at a first surface and outputting diffuse light from the first surface or a second surface. Outputting diffuse light includes allowing the incident light to interact with optically anisotropic molecules disposed between the first surface and the second surface. The optically anisotropic molecules are arranged such that light having a first set of properties, including a first polarization, is diffused by the optically anisotropic molecules and light having a second set of properties, including a second polarization that is different from the first polarization, is transmitted through the optically anisotropic molecules.

In accordance with some embodiments, a method of making an optical diffuser includes illuminating optically anisotropic molecules with directional light having a first polarization and, concurrently with illuminating the optically anisotropic molecules with the directional light, illuminating the optically anisotropic molecules with diffuse light having a second polarization that is different from the first polarization.

Thus, the disclosed embodiments provide a polarization selective optical diffuser that is capable of diffusing image light having a first polarization and transmitting ambient light that has a polarization different from the first polarization without diffusing the ambient light and without adding significant aberration or distortion to the ambient light.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

These figures are not drawn to scale unless indicated otherwise.

DETAILED DESCRIPTION

The present disclosure provides a polarization sensitive optical diffuser that diffuses first light having a first polarization and transmits second light, having a second polarization, without diffusing the second light. In some embodiments, the second light is transmitted without a change in direction and polarization.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first light projector could be termed a second light projector, and, similarly, a second light projector could be termed a first light projector, without departing from the scope of the various described embodiments. The first light projector and the second light projector are both light projectors, but they are not the same light projector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1:
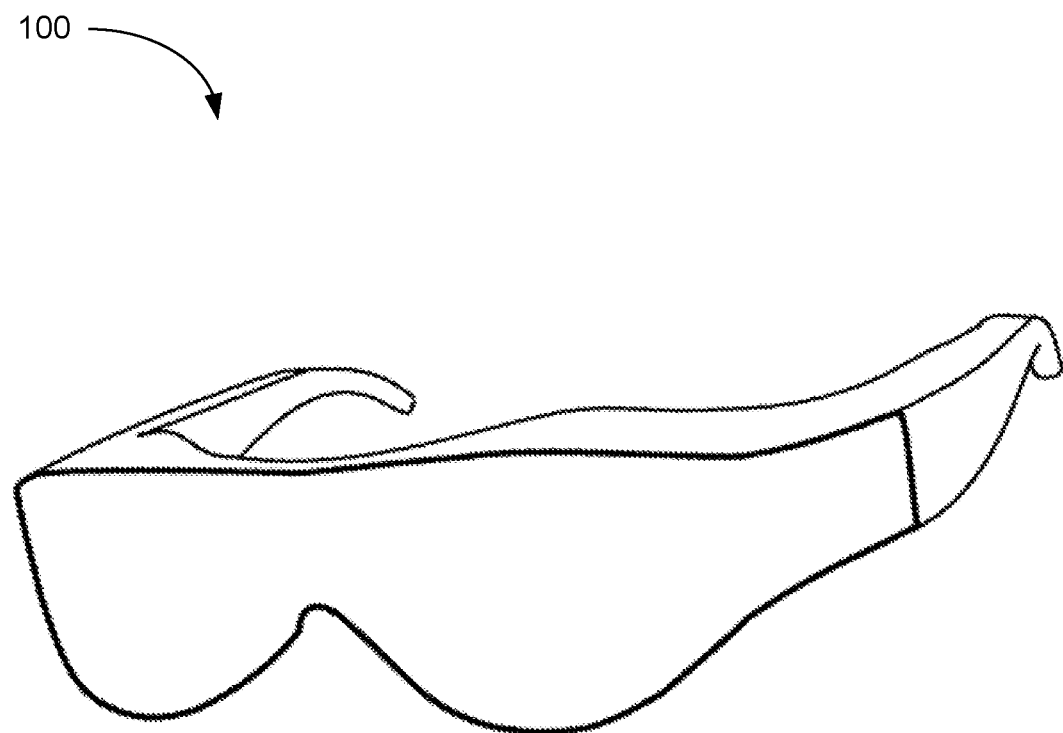
FIG. 1 is a perspective view of a display device in accordance with some embodiments.

FIG. 1 illustrates a perspective view of display device 100 in accordance with some embodiments. In some embodiments, display device 100 is configured to be worn on a head of a user (e.g., by having the form of spectacles or eyeglasses, as shown in FIG. 1, or to be included as part of a helmet that is to be worn by the user). When display device 100 is configured to be worn on a head of a user, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed-reality contents, or any combination thereof) to a user.

Figure 2:
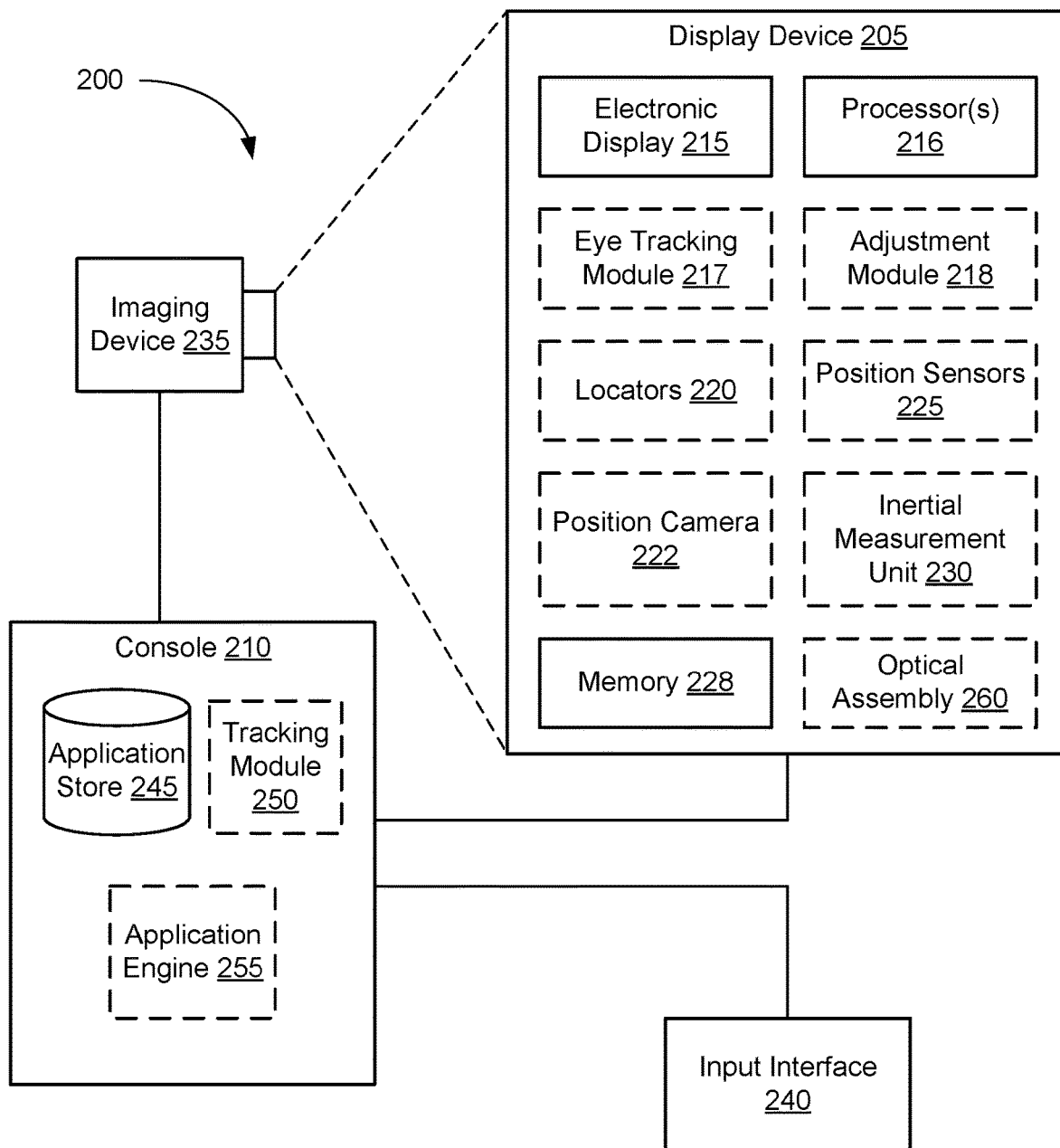
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed-reality by adding in a view of the real surroundings. Thus, display device 205 and system 200 described here can deliver augmented reality, virtual reality, and mixed-reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox. An eyebox is a region that is occupied by an eye of a user of display device 205 (e.g., a user wearing display device 205) who is viewing images from display device 205. In some embodiments, the eyebox is represented as a 10 mm×10 mm square. In some embodiments, the one or more optical components include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile sub-images together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260, which can include a single optical assembly 260 or multiple optical assemblies 260 (e.g., an optical assembly 260 for each eye of a user). In some embodiments, the one or more optical assemblies 260 receive image light for the computer generated images from the electronic display 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display 215 projects computer-generated images to one or more reflective elements (not shown), and the one or more optical assemblies 260 receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
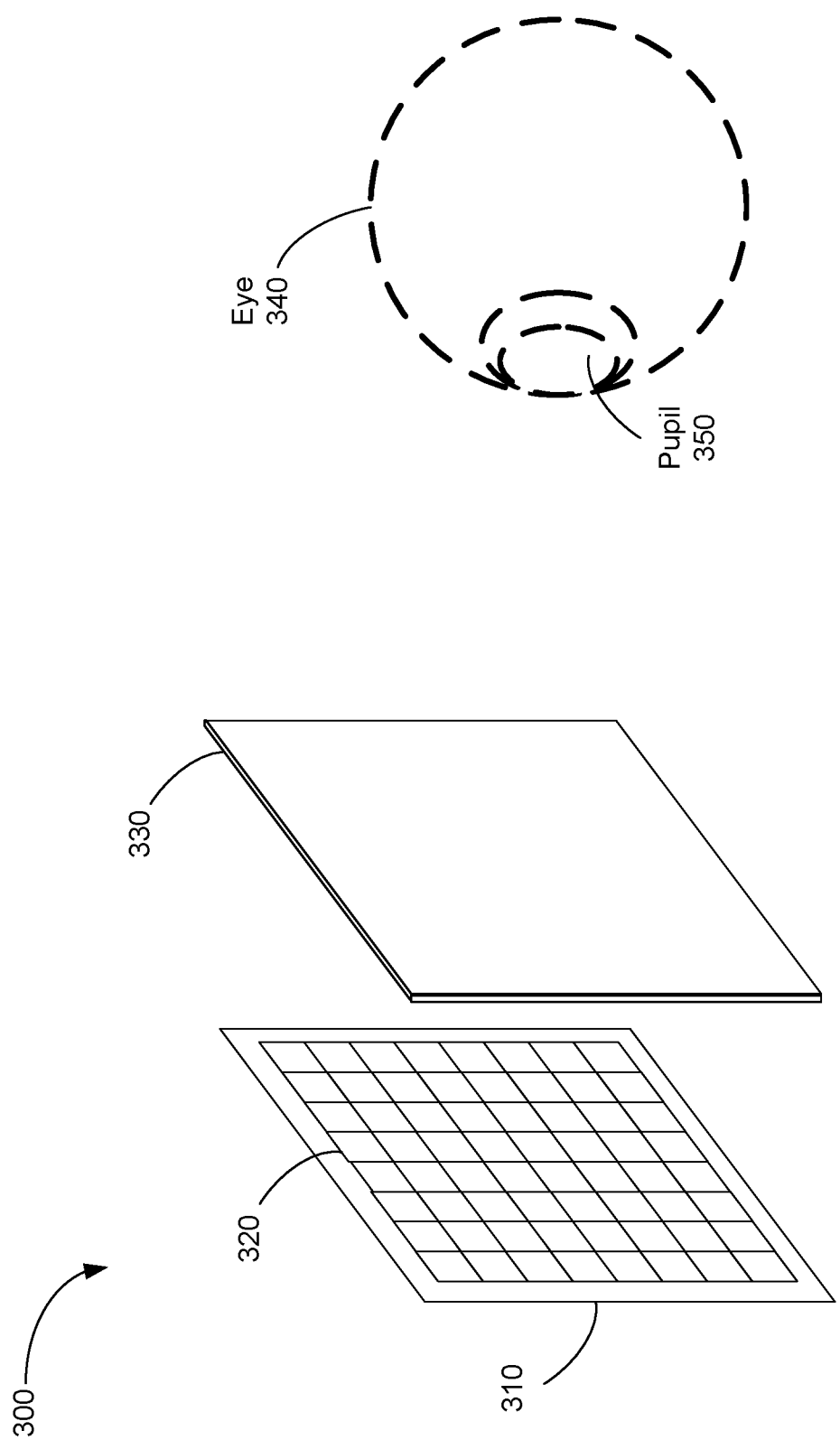
FIG. 3 is an isometric view of a display device in accordance with some embodiments.

FIG. 3 is an isometric view of a display device 300, which corresponds to part of or all of display device 100 (see FIG. 1) in accordance with some embodiments. In some embodiments, display device 300 includes a light emission device array 310 (e.g., a light emission device array or reflective element), and an optical assembly (e.g., optical assembly 260) having one or more optical components 330 (e.g., lenses). In some embodiments, display device 300 also includes an IR detector array.

In some embodiments, light emission device array 310 emits image light and optional IR light toward the optical components 330. Light emission device array 310 may be, e.g., an array of LEDs, an array of microLEDs, an array of OLED s, or some combination thereof. Light emission device array 310 includes light emission devices 320 that emit light in the visible light (and optionally includes devices that emit light in the IR).

In some embodiments, display device 300 includes an emission intensity array configured to selectively attenuate light emitted from light emission device array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the one or more optical components 330. In some embodiments, display device 300 uses an emission intensity array to facilitate providing image light to a location of pupil 350 of eye 340 of a user, and minimize the amount of image light provided to other areas in the eyebox.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more optical components 330 toward the determined location of pupil 350, and not toward another presumed location.

In some embodiments, display device 300 includes one or more broadband sources (e.g., one or more white LEDs) coupled with a plurality of color filters, in addition to, or instead of, light emission device array 310.

One or more optical components 330 receive the image light (or modified image light, e.g., attenuated light) from light emission device array 310, and direct the image light to a detected or presumed location of the pupil 350 of an eye 340 of a user. In some embodiments, the one or more optical components include one or more optical assemblies 260.

Figure 4A:
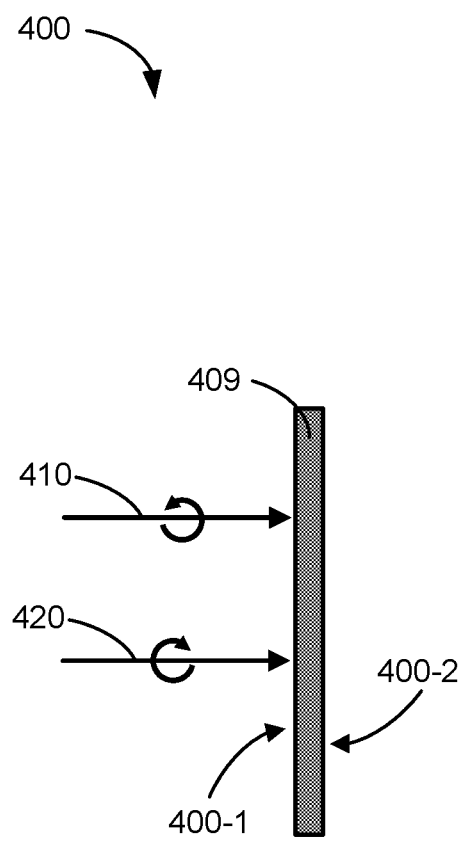
FIG. 4A is a cross-sectional diagram of a polarization sensitive optical diffuser in accordance with some embodiments.

FIG. 4A is a cross-sectional diagram of a polarization sensitive optical diffuser 400 in accordance with some embodiments. Polarization sensitive optical diffuser 400 includes a first surface 400-1, a second surface 400-2 opposite to first surface 400-1, and optically anisotropic molecules 409 disposed between the first surface 400-1 and the second surface 400-2. Polarization sensitive optical diffuser 400 is configured to output diffuse light upon receiving first light (e.g., light 410) having first circular polarization (e.g., right-handed circular polarization or RCP), and to transmit second light (e.g., light 420) having second circular polarization (e.g., left-handed circular polarization or LCP) that is different from (e.g., orthogonal to) the first circular polarization, or vice versa.

Figure 4B:
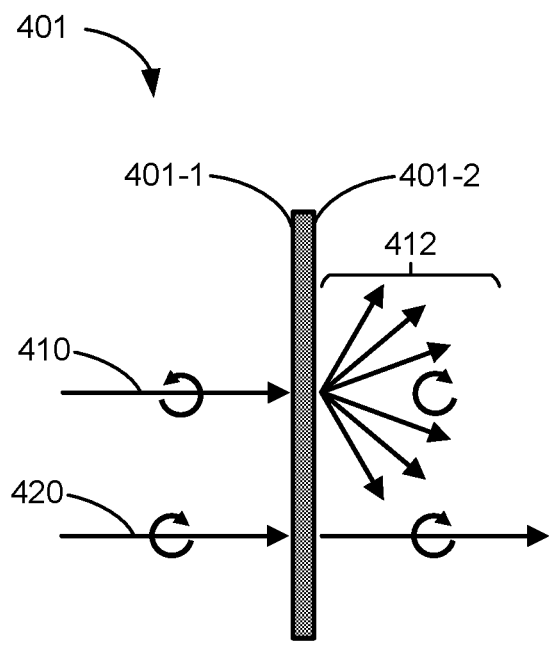
FIG. 4B is a cross-sectional diagram of a transmissive polarization sensitive optical diffuser in accordance with some embodiments.
Figure 4C:
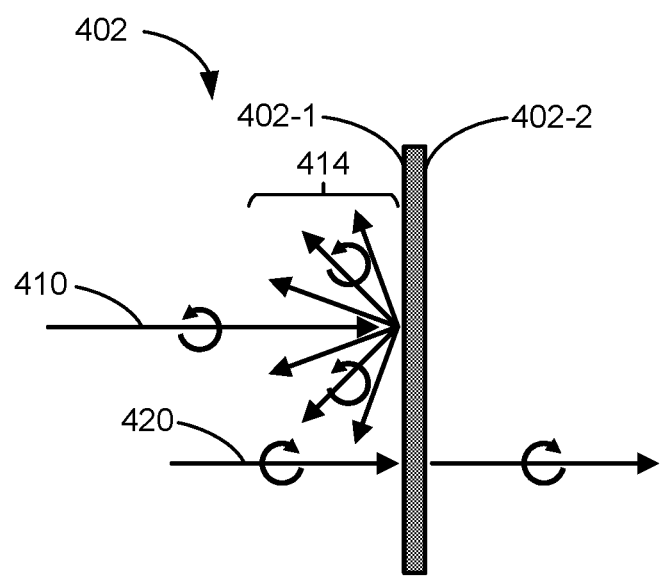
FIG. 4C is a cross-sectional diagram of a reflective polarization sensitive optical diffuser in accordance with some embodiments.

Polarization sensitive optical diffuser 400 may be a transmissive polarization sensitive optical diffuser, such as the transmissive polarization sensitive optical diffuser 401 shown in FIG. 4B, or a reflective polarization sensitive optical diffuser, such as the reflective polarization sensitive optical diffuser 402, shown in FIG. 4C.

As shown in FIG. 4B, transmissive polarization sensitive optical diffuser 401 includes a first surface 401-1, a second surface 401-2 opposite to first surface 401-1, and optically anisotropic molecules disposed between the first surface 401-1 and the second surface 401-2. In some embodiments, transmissive polarization sensitive optical diffuser 401 is configured to output light from second surface 401-2 in response to receiving incident light at first surface 401-1. As shown, when the incident light (e.g., light 410) has the first circular polarization, diffuse light 412 having the second circular polarization is output from the second surface 401-2. In some embodiments, light 410 is substantially collimated and propagating in a first direction. In some embodiments, transmissive polarization sensitive optical diffuser 401 is configured to diffuse the light 410 so as to output diffuse light 412 that propagates in a plurality of directions. When the incident light (e.g., light 420) has the second circular polarization, transmissive polarization sensitive optical diffuser 401 is configured to transmit the light 420. Thus, light 420 is output from the second surface 401-2. In some embodiments, light 420 is transmitted without change in polarization or direction.

As shown in FIG. 4C, reflective polarization sensitive optical diffuser 402 includes a first surface 402-1, a second surface 402-2 opposite to first surface 402-1, and optically anisotropic molecules disposed between the first surface 402-1 and the second surface 402-2. In some embodiments, reflective polarization sensitive optical diffuser 402 is configured to output light from the first surface 402-1 in response to receiving incident light at the first surface 402-1. As shown, when the incident light (e.g., light 410) has the first circular polarization, diffuse light 414 having the first circular polarization is output from the first surface 402-1. In some embodiments, the light 410 is substantially collimated and propagating in a first direction. In some embodiments, reflective polarization sensitive optical diffuser 402 is configured to diffuse the light 410 to output diffuse light 414 that propagates in a plurality of directions. When the incident light (e.g., light 420) has the second circular polarization, reflective polarization sensitive optical diffuser 402 is configured to transmit light 420 from the second surface 402-2. In some embodiments, light 420 is transmitted without change in polarization or direction.

In some embodiments, a polarization sensitive optical diffuser (e.g., polarization sensitive optical diffuser 400, transmissive polarization sensitive optical diffuser 401, reflective polarization sensitive optical diffuser 402) may be incident angle selective, and/or to be wavelength selective.

Figure 4D:
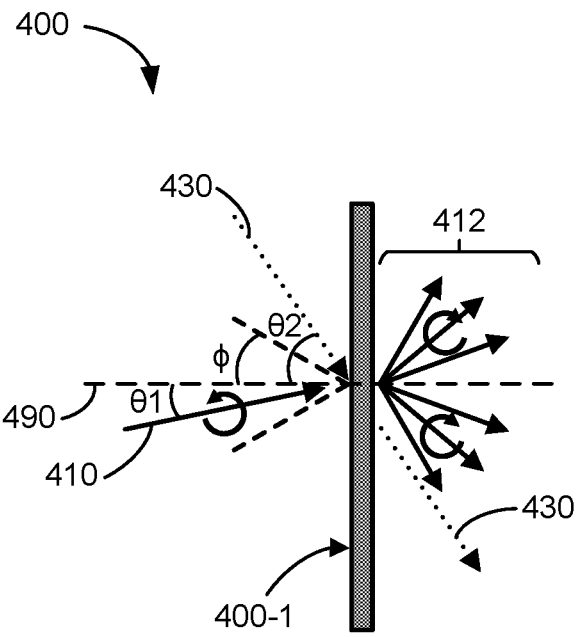
FIG. 4D is a schematic diagram illustrating incident angle selectivity of a polarization sensitive optical diffuser in accordance with some embodiments.

For example, as shown in FIG. 4D, polarization sensitive optical diffuser 400, which in this example is a transmissive polarization sensitive optical diffuser, can be incident angle selective and interact differently with incident light having different incident angles with respect to a direction indicated by dashed line 490 that is normal to first surface 400-1. In some embodiments, polarization sensitive optical diffuser 400 is configured to diffuse light having the first circular polarization and incident upon polarization sensitive optical diffuser 400 at an incident angle that is within a first predefined incident angle range (e.g., smaller than angle $\phi$). In some embodiments, polarization sensitive optical diffuser 400 is configured to transmit third light that is incident upon polarization sensitive optical diffuser 400 at an incident angle that is outside of the first predefined incident angle range (e.g., equal or larger than $\phi$), regardless of the polarization of the light.

As shown, light 410 having the first circular polarization can be incident upon polarization sensitive optical diffuser 400 in a direction that forms a first incident angle $\theta 1$ with respect to dashed line 490. First incident angle $\theta 1$ is within the first predefined incident angle range (e.g., $\theta 1 < \phi$). Thus, light 410 is diffused at polarization sensitive optical diffuser 400, and diffuse light 412 having the second circular polarization is output from polarization sensitive optical diffuser 400 in response to light 410. On the other hand, light 430 is incident upon polarization sensitive optical diffuser 400 at a second incident angle $\theta 2$ that is outside the first predefined incident angle range (e.g., $\theta 2 \geq \phi$). Thus, light 430 is transmitted through polarization sensitive optical diffuser 400 without change in direction or polarization.

Figure 4E:
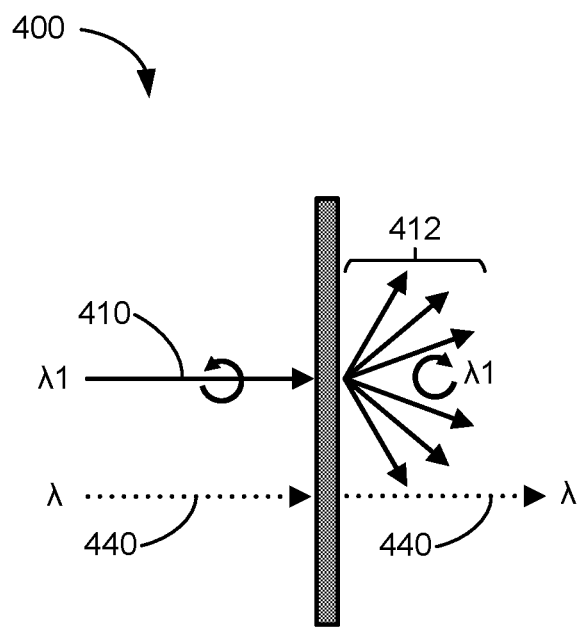
FIG. 4E is a schematic diagram illustrating wavelength selectivity of a polarization sensitive optical diffuser in accordance with some embodiments.

FIG. 4E illustrates wavelength selectivity of polarization sensitive optical diffuser 400 in accordance with some embodiments. In some embodiments, polarization sensitive optical diffuser 400 is configured to diffuse light having the first circular polarization and a wavelength that is within a first predefined spectral range, and to transmit light having a wavelength that is outside of the first predefined spectral range regardless of the polarization of the light.

As shown, light 410, having the first circular polarization and a first wavelength $\lambda 1$ that is within the first predefined spectral range, is incident upon polarization sensitive optical diffuser 400. Thus, light 410 is diffused at polarization sensitive optical diffuser 400 and diffuse light 412 having the second circular polarization is output from polarization sensitive optical diffuser 400. On the other hand, light 440, which has a wavelength $\lambda$ that is outside the first predefined spectral range, is transmitted through polarization sensitive optical diffuser 400 without a change in direction or polarization.

Although polarization sensitive optical diffuser 400 is illustrated in FIGS. 4D and 4E as a transmissive polarization sensitive optical diffuser (e.g., transmissive polarization sensitive optical diffuser 401), it can be understood that descriptions provided above with respect to incident angle selectivity and wavelength selectivity are also applicable to a reflective polarization sensitive optical diffuser (e.g., reflective polarization sensitive optical diffuser 402).

Figure 5:
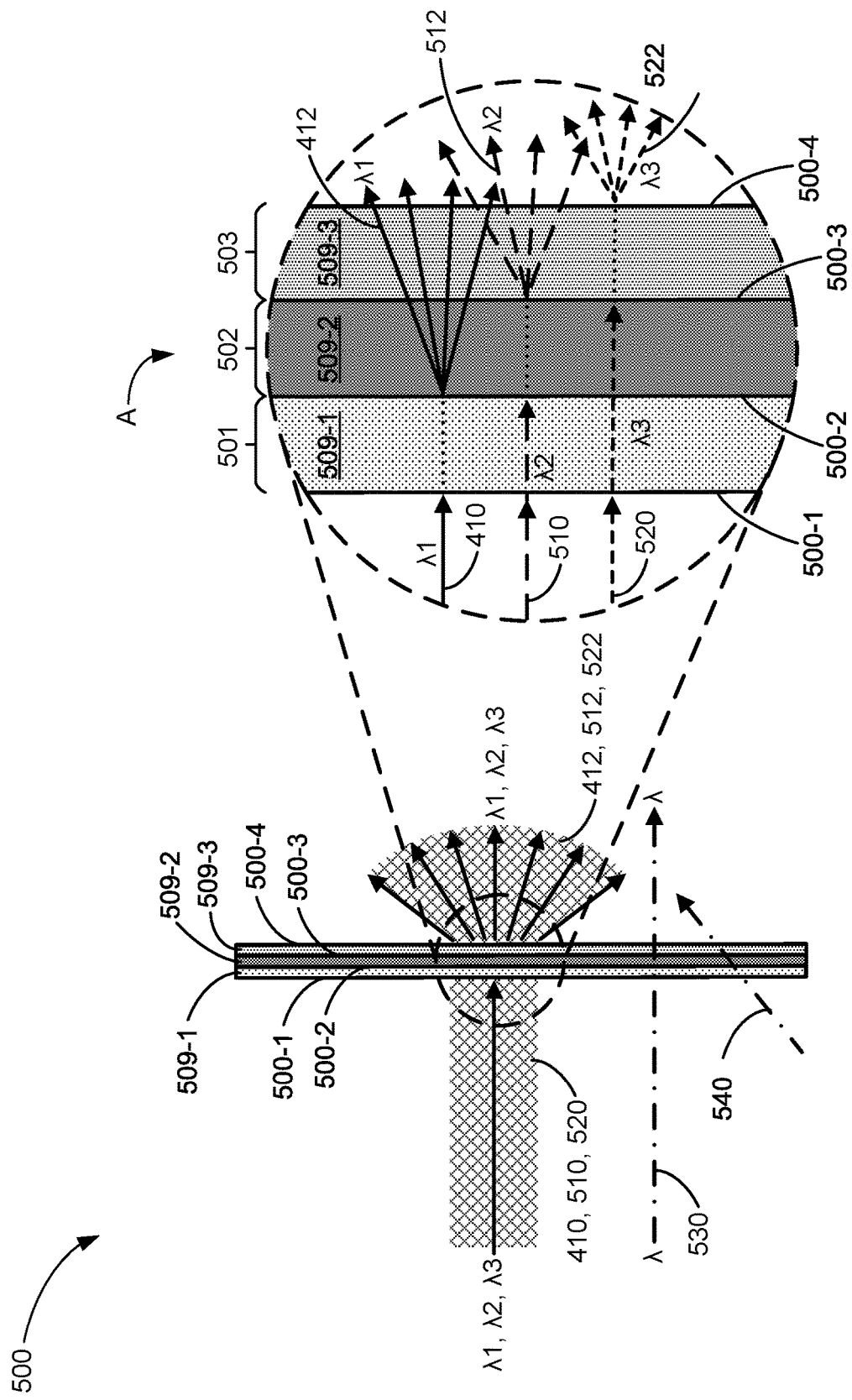
FIG. 5 is a schematic diagram illustrating the optical path of light transmitted through a polarization sensitive optical diffuser in accordance with some embodiments.

FIG. 5 illustrates a polarization sensitive optical diffuser 500 and optical paths of light transmitted through polarization sensitive optical diffuser 500 in accordance with some embodiments. In some embodiments, as shown in FIG. 5, polarization sensitive optical diffuser 500 includes a plurality of optical diffuser layers (e.g., first optical diffuser layer 501, second optical diffuser layer 502, and third optical diffuser layer 503). First optical diffuser layer 501 has a first surface 500-1, a second surface 500-2, and optically anisotropic molecules 509-1 disposed between first surface 500-1 and second surface 500-2. Third optical diffuser layer 503 has a third surface 500-3, a fourth surface 500-4, and optically anisotropic molecules 509-3 disposed between third surface 500-3 and fourth surface 500-4. Second optical diffuser layer 502, has optically anisotropic molecules 509-2 disposed between second surface 500-2 and third surface 500-3.

In some embodiments, first optical diffuser layer 501 is configured to diffuse light having a wavelength that is within a first predefined spectral range, second optical diffuser layer 502 is configured to diffuse light having a wavelength that is within a second predefined spectral range that is different from the first predefined spectral range, and third optical diffuser layer 503 is configured to diffuse light having a wavelength that is within a third predefined spectral range that is different from the first predefined spectral range and from the second predefined spectral range. In some embodiments, polarization sensitive optical diffuser 500 is configured to diffuse light having a wavelength that is within a wider spectral range that encompasses the first predefined spectral range, the second predefined spectral range, and the third predefined spectral range. As shown in inset A, optically anisotropic molecules 509-1 that are disposed between first surface 500-1 and second surface 500-2 are arranged such that the first optical diffuser layer 501 diffuses light 410 having the first circular polarization and a first wavelength $\lambda 1$ that is within the first predefined spectral range. Thus, diffuse light 412 having the first wavelength $\lambda 1$ is output from first optical diffuser layer 501 via second surface 500-2. Optically anisotropic molecules 509-2 that are disposed between second surface 500-2 and third surface 500-3 are arranged such that second optical diffuser layer 502 diffuses light 510 having the first circular polarization and a second wavelength $\lambda 2$ that is within a second predefined spectral range and transmits diffuse light 412 without change in direction or polarization. Thus, diffuse light 512 having the second wavelength $\lambda 2$ is output from second optical diffuser layer 502 through third surface 500-3. Optically anisotropic molecules 509-3 that are disposed between third surface 500-3 and fourth surface 500-4 are arranged such that the third optical diffuser layer diffuses light 520 having the first circular polarization and a third wavelength $\lambda 3$ that is within a third predefined spectral range and transmits diffuse light 412 and diffuse light 512 without change in direction or polarization. Thus, diffuse light 522 having the third wavelength $\lambda 3$ is output from fourth surface 500-4, together with diffuse light 412 and diffuse light 512. Thus, when incident light (e.g., light 410, light 510, or light 520) having the first polarization and wavelengths within the wider spectral range encompassing the first predefined spectral range, the second predefined spectral range, and the third predefined spectral range is incident upon polarization sensitive optical diffuser 500, polarization sensitive optical diffuser 500 outputs diffuse light (e.g., diffuse light 412, diffuse light 512, or diffuse light 522) having wavelengths corresponding to the wavelengths of the incident light. Polarization sensitive optical diffuser 500 is also configured to receive light 530 having a wavelength that is outside the wider spectral range encompassing the first predefined spectral range, the second predefined spectral range, and the third predefined spectral range, and transmit the light 530, without change in polarization or direction, regardless of the polarization of the light 530. In some embodiments, when polarization sensitive optical diffuser 500 is configured to diffuse light having wavelengths within the wider spectral range encompassing the first predefined spectral range, the second predefined spectral range, and the third predefined spectral range, it may be desirable to design the first optical diffuser layer 501, the second optical diffuser layer 502, and the third optical diffuser layer 503 to diffuse light having a same handedness or polarization.

In some embodiments, polarization sensitive optical diffuser 500 may be configured to diffuse light that is incident upon polarization sensitive optical diffuser 500 with an incident angle that is within a wider incident angle range encompassing a first predefined incident angle range, a second predefined incident angle range that is different from the first predefined incident angle range, or a third predefined incident angle range that is different from the first predefined incident angle range and the second incident angle spectral range. For example, optically anisotropic molecules 509-1, disposed between first surface 500-1 and second surface 500-2, may be arranged such that the first optical diffuser layer diffuses light 410, having the first circular polarization and incident upon polarization sensitive optical diffuser 500 at first angle $\theta 1$ that is within the first predefined incident angle range, and outputs diffuse light 412. Optically anisotropic molecules 509-2, disposed between second surface 500-2 and third surface 500-3, are arranged such that the second optical diffuser layer diffuses light 510, having the first circular polarization and incident upon polarization sensitive optical diffuser 500 at a second angle that is within the second predefined incident angle range, and outputs diffuse light 512. Optically anisotropic molecules 509-3, disposed between third surface 500-3 and fourth surface 500-4, are arranged such that the third optical diffuser layer diffuses light 520, having the first circular polarization and incident upon polarization sensitive optical diffuser 500 at a third angle that is within the third predefined incident angle range, and outputs diffuse light 522. Thus, when incident light (e.g., light 410, light 510, light 520) having the first polarization and incident upon polarization sensitive optical diffuser 500 at an incident angle that is within the wider incident angle range encompassing the first predefined incident angle range, the second predefined incident angle range, or the third predefined incident angle range, polarization sensitive optical diffuser 500 outputs diffuse light (e.g., diffuse light 412, diffuse light 512, diffuse light 522. Polarization sensitive optical diffuser 500 is also configured to receive light (e.g., light 540) incident upon polarization sensitive optical diffuser 500 at an incident angle that is outside the wider incident angle range encompassing the first predefined incident angle range, the second predefined incident angle range, and the third predefined incident angle range, and transmit light 540, without change in polarization or direction, regardless of the polarization or wavelength of light 540. In some embodiments, when polarization sensitive optical diffuser 500 is configured to diffuse light having wavelengths within the wider spectral range encompassing the first predefined incident angle range, the second predefined incident angle range, and the third predefined incident angle range, it may be desirable to design the first optical diffuser layer 501, the second optical diffuser layer 502, and the third optical diffuser layer 503 to diffuse light having a same handedness.

Although polarization sensitive optical diffuser 500 is shown in FIG. 5 to include three optical diffuser layers, it is understood that polarization sensitive optical diffuser 500 may include any number of optical diffuser layers. Additionally, although polarization sensitive optical diffuser 500 is illustrated in as a transmissive polarization sensitive optical diffuser, it can be understood that descriptions provided with respect to FIG. 5 can also be applied to reflective polarization sensitive optical diffusers.

Figure 6C:
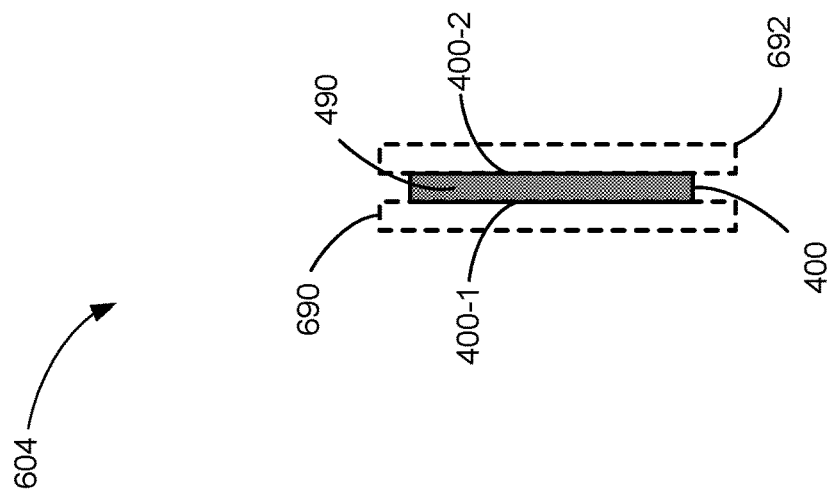
FIGS. 6A-6C are schematic diagrams illustrating a polarization sensitive optical diffuser in accordance with some embodiments.
Figure 6B:
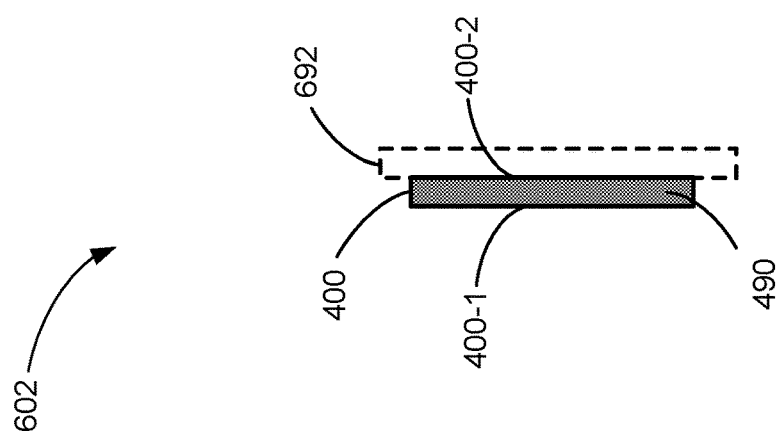
Figure 6A:
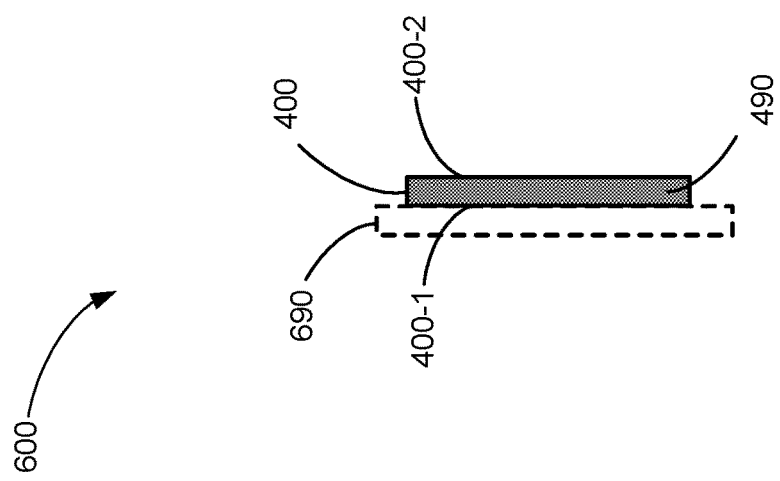

In some embodiments, a polarization sensitive optical diffuser may be a standalone optical element (e.g., does not include any substrates), as previously shown in FIGS. 4A-4E and 5. Alternatively, a polarization sensitive optical diffuser may also include one or more optically transparent substrates. FIGS. 6A-6C illustrate polarization sensitive optical diffusers 600, 602, and 604 each including polarization sensitive optical diffuser 400 and one or more optically transparent substrates 690 and/or 692 in accordance with some embodiments. Polarization sensitive optical diffuser 400 in polarization sensitive optical diffusers 600, 602, and 604 include features similar to those described above with respect to any of FIGS. 4A-4E.

In some embodiments, as shown in FIG. 6A, optically transparent substrate 690 is coupled to first surface 400-1. In a second example, polarization sensitive optical diffuser 602, shown in FIG. 6B, includes optically transparent substrate 692 coupled to the second surface 400-2. In a third example, polarization sensitive optical diffuser 604, shown in FIG. 6C, includes optically transparent substrate 690, coupled to first surface 400-1, and optically transparent substrate 692, coupled to second surface 400-2.

In some embodiments, one of the one or more optically transparent substrates 690, 692 may be a protective layer. Thus, in some embodiments, a polarization sensitive optical diffuser (e.g., such as polarization sensitive optical diffuser 600, 602, 604) may include a protective layer on either of the first surface 400-1 or the second surface 400-2. For example, substrate 692 may be a protective layer and polarization sensitive optical diffuser 604 includes substrate 690 coupled to the first surface 400-1, and a protective layer (e.g., substrate 692) coupled to the second surface 400-2.

In some embodiments, polarization sensitive optical diffuser 500 may include one or more optically transparent substrate (e.g., substrates 690 and 692) coupled to one or more of the plurality of optical diffuser layers (e.g., first optical diffuser layer 501, second optical diffuser layer 502, and third optical diffuser layer 503). For example, at least one of the first surface 600-1, second surface 600-2, third surface 600-3, or fourth surface 600-4 is coupled to optically transparent substrate 690 and/or protective layer 692 (e.g., optically transparent substrate 692).

In some embodiments, an optical diffuser (e.g., polarization sensitive optical diffusers 400, 402, 401, 402, 500, 600, 602, 604) may be a polarization sensitive hologram. In some embodiments, the optically anisotropic molecules (e.g., optically anisotropic molecules 409) form a polarization sensitive hologram.

Figure 7:
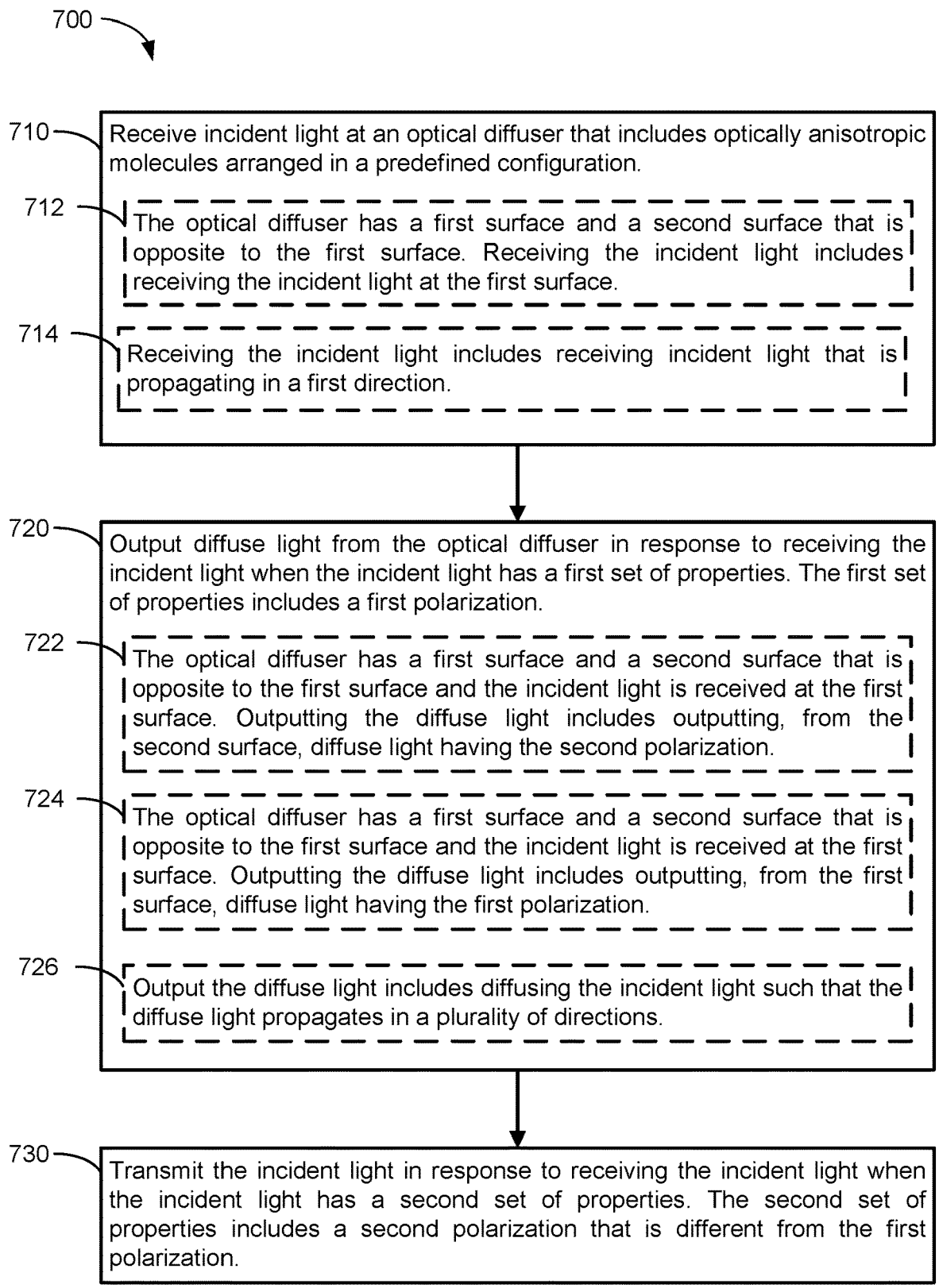
FIG. 7 is a flowchart illustrating a method of diffusing light in accordance with some embodiments.

FIG. 7 is a flowchart illustrating a method 700 of diffusing light in accordance with some embodiments. Method 700 includes (operation 710) receiving incident light 410 at an optical diffuser (e.g., polarization sensitive optical diffusers 400, 401, 402, 500, 600, 602, 604) that includes optically anisotropic molecules 409 arranged in a predefined configuration, and (operation 720) outputting diffuse light (e.g., light 412, 414) from the optical diffuser in response to receiving the incident light 410 when the incident light 410 has a first set of properties. The first set of properties includes a first polarization (e.g., first circular polarization). The method 700 also includes (operation 730) transmitting the incident light 410 in response to receiving the incident light 410 when the incident light 410 has a second set of properties. The second set of properties includes a second polarization (e.g., second circular polarization).

In some embodiments, the optical diffuser (e.g., polarization sensitive optical diffusers 400, 401, 402, 500, 600, 602, 604) has a first surface (e.g., first surface 400-1, 401-1, 402-1, 500-1) and a second surface (e.g., second surface 400-2, 401-2, 402-2, 500-2) that is opposite to the first surface, and (operation 712) receiving the incident light 410 includes receiving the incident light 410 at the first surface.

In some embodiments, the optical diffuser (e.g., polarization sensitive optical diffusers 400, 401, 500) has a first surface (e.g., first surface 400-1, 401-1, 500-1) and a second surface (e.g., second surface 400-2, 401-2, 500-2) that is opposite to the first surface. The incident light 410 is received at the first surface, and (operation 722) outputting the incident light 410 includes outputting the diffuse light 412 having the second polarization from the second surface.

In some embodiments, the optical diffuser (e.g., polarization sensitive optical diffusers 400, 402) has a first surface (e.g., first surface 400-1, 402-1) and a second surface (e.g., second surface 400-2, 402-2) that is opposite to the first surface. The incident light 410 is received at the first surface, and (operation 724) outputting the incident light 410 includes outputting the diffuse light 414 having the first polarization from the first surface.

In some embodiments, method 700 further includes (operation 714) receiving incident light (e.g., light 410) that is propagating in a first direction, and (operation 726) outputting the diffuse light (e.g., diffuse light 412, 414) such that the diffuse light propagates in a plurality of directions.

Figure 8:
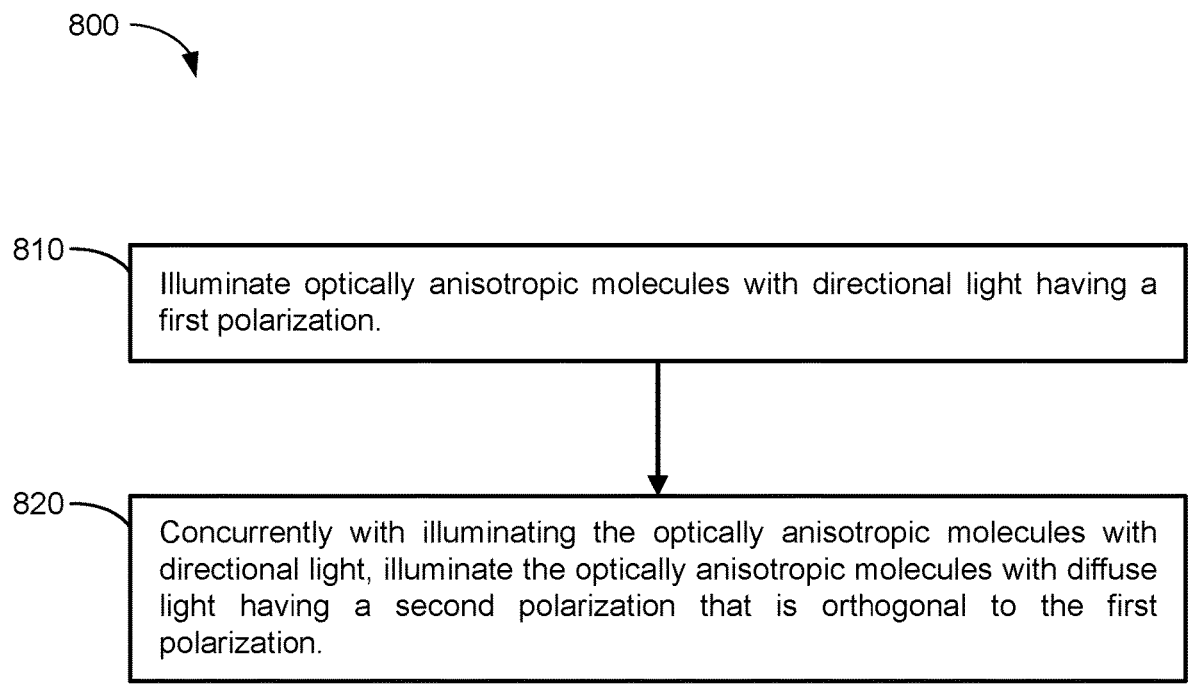
FIG. 8 is a flowchart illustrating a method of creating a polarization sensitive optical diffuser in accordance with some embodiments.

FIG. 8 is a flowchart illustrating a method 800 of creating a polarization sensitive optical diffuser in accordance with some embodiments. Method 800 includes (step 810) illuminating optically anisotropic molecules (e.g., molecules of an alignment layer, bulk liquid crystal material) with directional light (e.g., propagating in a first direction, substantially collimated light) having first polarization (e.g., first circular polarization), and (step 820) concurrently with illuminating the optically anisotropic molecules with directional light, illuminating the optically anisotropic molecules with diffuse light (e.g., propagating in a plurality of directions) having second polarization (e.g., second circular polarization) that is orthogonal to the first polarization.

In some embodiments, a polarization sensitive optical diffuser may include an alignment layer (e.g., a photoalignment layer, a layer including organic or inorganic compounds including photosensitive groups) and helical structures formed by optically anisotropic molecules. In such cases, the alignment layer is formed by adding a layer of photoalignment material on a surface of the polarization sensitive optical diffuser. The alignment layer is then exposed to alignment light (e.g., linearly, circularly, or elliptically polarized light) with a desired intensity and incident angle. The alignment light is scanned over the alignment layer while rotating polarization of the alignment light, effectively writing an x-y alignment pattern onto an alignment layer in two dimensions. After preparation of the alignment layer, a layer of optically anisotropic molecules is applied onto the alignment layer, forming helical structures. The x-y alignment pattern of the alignment layer defines the orientation of the helical structures of the optically anisotropic molecules. After formation of the helical structures, the layer of optically anisotropic molecules is firmed (e.g., fixed, set, or cured) to form a polymer. In some embodiments, the firming includes thermal and/or UV curing. In some embodiments, helical structures are formed of liquid crystals, such as cholesteric liquid crystals. The helical structures are aligned along helical axes. In some embodiments, each of the helical axes are substantially parallel to the z-axis (e.g., each helical axis and the z-axis form an angle less than 1 degree). Alternatively, the helical axes may form a non-zero angle with respect to the z-axis. In some embodiments, the optically anisotropic molecules are rotated in a same rotational direction (forming a helical twist) about a respective helical axis.

In some embodiments, a polarization sensitive optical diffuser does not include an alignment layer and the helical structures of the polarization sensitive optical diffuser are formed without an alignment layer.

In some embodiments, a polarization sensitive optical diffuser includes bulk liquid crystal. In such cases, an x-y-z alignment pattern can be written in three dimensions in the bulk liquid crystal material.

Figure 9:
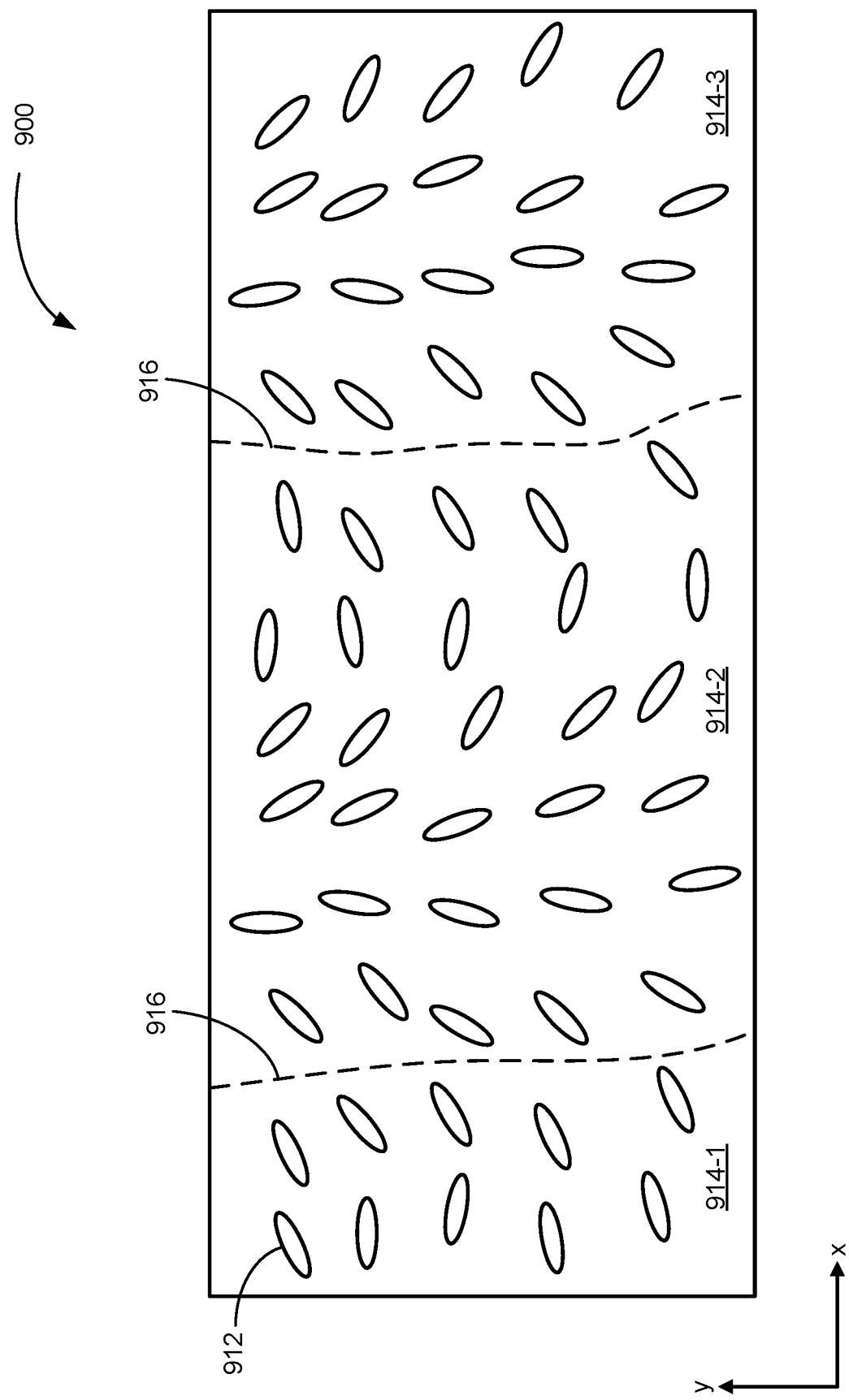
FIG. 9 is a schematic diagram illustrating a polarization sensitive optical diffuser according to some embodiments.

FIG. 9 is a schematic diagram illustrating a polarization sensitive optical diffuser 900, corresponding to any of polarization sensitive optical diffusers 400-402, according to some embodiments. Each rod 912 is a representation of an orientation of an optically anisotropic molecule in polarization sensitive optical diffuser 900. Dashed lines 916 demarcate transitions between different domains 914-1, 914-2, and 914-3. In general, the boundaries can be located anywhere in the polarization sensitive optical diffuser. In some embodiments, the boundaries are periodic such that the boundaries are spaced apart evenly (e.g., forming a periodic structure of domains). In some embodiments, the orientations of the optically anisotropic molecules in polarization sensitive optical diffuser 900 follow a mostly periodic pattern along the x direction. In some embodiments, the transitions 916 are spaced apart almost evenly and can be located anywhere in the polarization sensitive optical diffuser 900. Although three domains are shown for illustrative purposes, polarization sensitive optical diffuser 900 may have any number of domains.

As shown, optically anisotropic molecules in each domain are aligned to form a grating-like pattern. Thus, in each domain, the optically anisotropic molecules are configured to diffract incident light, having a desired handedness and being within predetermined angular and wavelength ranges, in a specific direction. As shown, the alignment of the optically anisotropic molecules vary slightly between two adjacent domains and thus, optically anisotropic molecules in adjacent domains are configured to diffract the incident light in different directions, resulting in an overall effect of diffuse light being output from the polarization sensitive optical diffuser 900. For example, optically anisotropic molecules in domain 914-1 may be configured to direct (e.g., diffract) the incident light in a first direction, optically anisotropic molecules in domain 914-2 are configured to direct (e.g., diffract) the incident light in a second direction that is different from the first direction, and optically anisotropic molecules in domain 914-3 are configured to direct (e.g., diffract) the incident light in a third direction that is different from each of the first and second directions. Thus, the combined effect of diffracting light in slightly different directions at different domains of polarization sensitive optical diffuser 900 results in the incident light being diffused and output as diffuse light. Additionally, just as an optical grating can be designed to redirect light at a predetermined direction (e.g., predetermined angle), polarization sensitive optical diffuser 900 can also be designed to output diffuse light such that a chief ray of the output diffuse light propagates in a predetermined direction (e.g., forms a predetermined angle with respect to a surface of polarization sensitive optical diffuser 900).

In light of these principles, we now turn to certain embodiments of a polarization sensitive optical diffuser (e.g., polarization sensitive optical diffusers 400, 401, 402, 500, 502, 504, 500).

In accordance with some embodiments, an optical diffuser (e.g., polarization sensitive optical diffusers 400, 401, 402, 500, 600, 602, 604) includes optically anisotropic molecules (e.g., optically anisotropic molecules 409) that are arranged in a predefined configuration such that the optical diffuser outputs diffuse light (e.g., light 412, 414) upon receiving first light (e.g., light 410) having a first polarization (e.g., first circular polarization) and transmits second light (e.g., light 420) having a second polarization (e.g., second circular polarization) that is different from (e.g., orthogonal to) the first polarization upon receiving the second light.

In some embodiments, the optical diffuser (e.g., polarization sensitive optical diffuser 401) includes a first surface (e.g., first surface 401-1), a second surface (e.g., second surface 401-2) that is opposite to the first surface. The optical diffuser is configured to receive the first light (e.g., light 410) at the first surface (e.g., first surface 401-1) and to output the diffuse light (e.g., diffuse light 412) from the second surface (e.g., second surface 401-2). The diffuse light has the second polarization (e.g., second circular polarization).

In some embodiments, the optical diffuser (e.g., polarization sensitive optical diffuser 402) includes a first surface (e.g., first surface 402-1), a second surface (e.g., second surface 402-2) that is opposite to the first surface. The optical diffuser is configured to receive the first light (e.g., light 410) at the first surface (e.g., first surface 402-1) and to output the diffuse light (e.g., diffuse light 414) from the first surface. The diffuse light has the first polarization (e.g., first circular polarization).

In some embodiments, the optical diffuser (e.g., polarization sensitive optical diffusers 400, 401, 402, 500, 600, 602, 604) is configured to receive the first light (e.g., light 410) propagating in a first direction (e.g. the first light is substantially collimated) and to diffuse the first light such that the diffuse light propagates in a plurality of directions.

In some embodiments, the optical diffuser (e.g., polarization sensitive optical diffusers 400, 401, 402, 500) includes a first surface (e.g., first surface 400-1, 401-1, 402-1, 500-1), a second surface (e.g., second surface 400-2, 401-2, 402-2, 500-2) that is opposite to the first surface. The first light (e.g., light 410) is incident upon the first surface (e.g., first surface 400-1, 401-1, 402-1, 500-1) at an incident angle (e.g., first incident angle θ1) that is within a first predefined incident angle range (e.g., first predefined incident angle range φ). The optical diffuser is further configured to transmit third light (e.g., light 430) that is incident upon either the first surface or the second surface (e.g., second surface 400-2, 401-2, 402-2, 500-2) at an angle that is outside of the first predefined incident angle range.

In some embodiments, the first light (e.g., light 410) has a first wavelength (e.g., first wavelength λ1) that is within a first predefined spectral range. The optical diffuser is further configured to transmit fourth light (e.g., light 440) having wavelength that is outside of the predefined spectral range, regardless of the polarization of the fourth light.

In some embodiments, the first light (e.g., light 410) has a first wavelength (e.g., first wavelength λ1) that is within a first predefined spectral range. In some embodiments, the optical diffuser (e.g., optical diffuser 500) further includes a third surface (e.g., third surface 500-3) that is located proximate to (e.g., close to, in proximity to) the second surface (e.g., second surface 500-2). The optically anisotropic molecules are disposed between the second surface and the third surface, and arranged such that the optical diffuser diffuses fifth light (e.g., fifth light 510) as well as the first light and transmits sixth light (e.g., sixth light 530) as well as the second light (e.g., second light 520). The fifth light has the first polarization and a second wavelength (e.g., second wavelength λ2) that is within a second predefined spectral range that is different from the first predefined spectral range. The sixth light has a wavelength outside of the first spectral range and the second spectral range. The optical diffuser is configured to transmit the sixth light regardless of the polarization of the sixth light.

In some embodiments, the first light (e.g., light 410) is incident upon the optical diffuser (e.g., polarization sensitive optical diffuser 500) at a first incident angle (e.g., first incident angle θ1) that is within a first predefined incident angle range (e.g., first predefined incident angle range φ). In some embodiments, the optical diffuser further includes a fourth surface (e.g., third surface 500-3) that is located proximate to (e.g., close to, in proximity to) the second surface (e.g., second surface 500-2). The optically anisotropic molecules are disposed between the second surface and the fourth surface, and arranged such that the optical diffuser diffuses seventh light as well as the first light and transmits eighth light as well as the second light (e.g., second light 520). The seventh light has the first polarization and is incident upon the optical diffuser at a second incident angle that is within a second predefined incident angle range that is different from the first predefined incident angle range. The eighth light has a wavelength outside of the first incident angle range and the second incident angle range. The optical diffuser is configured to transmit the eighth light regardless of the polarization of the eighth light.

In some embodiments, the optically anisotropic molecules (e.g., optically anisotropic molecules 409) form a polarization sensitive hologram.

In some embodiments, the optical diffuser (e.g., polarization sensitive optical diffusers 500, 600, 602, 604) includes one or more optically transparent substrates (e.g., first optically transparent substrate 590, second optically transparent substrate 592). The optical diffuser has a first surface and a second surface opposite to the first surface (e.g., first surface 400-1, 401-1, 402-1, 500-1) and a second surface (e.g., second surface 400-2, 401-2, 402-2, 500-2) and at least one of the first surface and the second surface is coupled to one of the one or more optically transparent substrates. For example, first surface 400-1 may be coupled to first optically transparent substrate 590 and/or second surface 400-2 may be coupled to second optically transparent substrate 592. In some embodiments, when the optical diffuser has one or more surfaces in addition to the first surface and the second surface, the optical diffuser may include one or more optically transparent substrates such that at least two surfaces are coupled to opposite sides of a same optically transparent substrate. For example, polarization sensitive optical diffuser 500 may include an optically transparent substrate located between and coupled to first surface 400-1 and second surface 400-2.

In some embodiments, the optical diffuser (e.g., polarization sensitive optical diffuser 500) has a first surface (e.g., first surface 400-1, 401-1, 402-1, 500-1) and a second surface (e.g., second surface 400-2, 401-2, 402-2, 500-2) that is opposite to the first surface. The optical diffuser includes a protective layer on either the first surface of the second surface. For example, the second optical diffuser layer 502 may include first optically transparent substrate 590 and second optically transparent substrate 592 and second optically transparent substrate 592 may be a protective layer.

In some embodiments, the optical diffuser (e.g., polarization sensitive optical diffusers 500, 600, 602, 604) has a first surface (e.g., first surface 400-1, 401-1, 402-1, 500-1) and a second surface (e.g., second surface 400-2, 401-2, 402-2, 500-2) that is opposite to the first surface. The optical diffuser includes one or more photoalignment layers (e.g., photoalignment layers) and at least one of the first surface and the second surface is coupled to one of the one or more photoalignment layers.

In some embodiments, the optically anisotropic molecules (e.g., optically anisotropic molecules 409) are arranged in a helical configuration.

In some embodiments, the optically anisotropic molecules (e.g., optically anisotropic molecules 409 include a chiral dopant.

In some embodiments, the optically anisotropic molecules are arranged in a plurality of domains. Each domain of the plurality of domains includes a portion of the optically anisotropic molecules forming a grating-like pattern. Portions of optically anisotropic molecules in adjacent domains are configured to diffract the first light in different directions.

In accordance with some embodiments, a method (e.g., method 700) for diffusing light includes (operation 710) receiving incident light (e.g., light 410) at an optical diffuser (e.g., polarization sensitive optical diffusers 400, 401, 402, 500, 600, 602, 604) that includes optically anisotropic molecules (e.g., optically anisotropic molecules 409). The method also includes (operation 720) outputting diffuse light (e.g., diffuse light 412, 414) from the optical diffuser in response to receiving the incident light when the incident light has a first set of properties. The first set of properties include a first polarization (e.g., first circular polarization). The method also includes (operation 730) transmitting the incident light in response to receiving the incident light when the incident light has a second set of properties. The second set of properties include a second polarization (e.g., second circular polarization) that is different from (e.g., orthogonal to) the first polarization.

In some embodiments, the optical diffuser (e.g., polarization sensitive optical diffusers 400, 401, 500) includes a first surface (e.g., first surface 400-1, 401-1, 500-1) and a second surface (e.g., second surface 400-2, 401-2, 500-2) that is opposite to the first surface. Receiving the incident light (e.g., incident light 410) includes (operation 712) receiving the incident light at the first surface, and outputting diffuse light includes (operation 722) outputting diffuse light (e.g., diffuse light 414) having the second polarization from the second surface (e.g., second surface 400-2, 401-2, 500-2).

In some embodiments, the optical diffuser (e.g., polarization sensitive optical diffusers 400, 402, 500) includes a first surface (e.g., first surface 400-1, 402-1, 500-1) and a second surface (e.g., second surface 400-2, 402-2, 500-2) that is opposite to the first surface. Receiving the incident light (e.g., incident light 410) includes (operation 712) receiving the incident light at the first surface, and outputting diffuse includes (operation 724) outputting diffuse light (e.g., diffuse light 412) having the first polarization from the first surface (e.g., first surface 400-1, 402-1, 500-1).

In some embodiments, receiving the incident light (e.g., light 410) includes (operation 714) receiving incident light that is propagating in a first direction and outputting diffuse light (e.g., diffuse light 412, 414) includes (operation 726) diffusing the first light such that the diffuse light propagates in a plurality of directions.

In accordance with some embodiments, a method (e.g., method 800) of making an optical diffuser (e.g., polarization sensitive optical diffusers 400, 401, 402, 500, 600, 602, 604) includes (step 810) illuminating optically anisotropic molecules with directional light (e.g., propagating in a first direction, substantially collimated light) having a first polarization (e.g., first circular polarization), and (step 820) concurrently with illuminating optically anisotropic molecules with the directional light, illuminating optically anisotropic molecules with diffuse light (e.g., propagating in a plurality of directions) having a second polarization (e.g., second circular polarization) that is different from (e.g., orthogonal to) the first polarization.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical diffuser, comprising:
optically anisotropic molecules arranged in a predefined configuration such that the optical diffuser outputs diffuse light upon receiving first light having a first polarization and transmits second light having a second polarization that is different from the first polarization upon receiving the second light, wherein:
the first light has a wavelength within a first predefined spectral range; and
the optical diffuser is further configured to transmit fourth light having wavelength outside of the first predefined spectral range regardless of a polarization of the fourth light.

2. The optical diffuser of claim 1, wherein the optical diffuser has a first surface and a second surface opposite to the first surface, and the optical diffuser is configured to:
receive the first light at the first surface; and
output the diffuse light from the second surface, the diffuse light having the second polarization.

3. The optical diffuser of claim 1, wherein the optical diffuser has a first surface and a second surface opposite to the first surface, and the optical diffuser is configured to:
receive the first light at the first surface; and
output the diffuse light from the first surface, the diffuse light having the first polarization.

4. The optical diffuser of claim 1, wherein the optical diffuser is configured to receive the first light propagating in a first direction and to diffuse the first light such that the diffuse light propagates in a plurality of directions.

5. The optical diffuser of claim 2, further comprising:
a third surface proximate to the second surface; and
optically anisotropic molecules disposed between the second surface and the third surface and arranged such that the optical diffuser diffuses fifth light as well as the first light and transmits sixth light as well as the second light, wherein
the fifth light has the first polarization and a wavelength within a second predefined spectral range that is different from the first predefined spectral range;
the sixth light has a wavelength outside of the first predefined spectral range and the second predefined spectral range; and
the optical diffuser is configured to transmit the sixth light regardless of a polarization of the sixth light.

6. The optical diffuser of claim 1, further comprising one or more optically transparent substrates, wherein the optical diffuser has a first surface and a second surface opposite to the first surface, and at least one of the first surface and the second surface is coupled to one of the one or more optically transparent substrate.

7. The optical diffuser of claim 1, wherein the optical diffuser has a first surface and a second surface opposite to the first surface, and the optical diffuser further includes a protective layer on either of the first surface or the second surface.

8. The optical diffuser of claim 1, wherein the optical diffuser has a first surface and a second surface opposite to the first surface, and the optical diffuser further includes one or more photoalignment layers, wherein at least one of the first surface and the second surface is coupled to one of the one or more photoalignment layers.

9. The optical diffuser of claim 1, wherein the optically anisotropic molecules are arranged in a helical configuration.

10. The optical diffuser of claim 1, wherein the optically anisotropic molecules include a chiral dopant.

11. The optical diffuser of claim 1, wherein:
the optically anisotropic molecules are arranged in a plurality of domains, each of the plurality of domains including a portion of the optically anisotropic molecules forming a grating-like pattern; and
portions of optically anisotropic molecules in adjacent domains are configured to diffract the first light in different directions.

12. A method of diffusing light, the method comprising:
receiving incident light at the optical diffuser of claim 1, including optically anisotropic molecules arranged in a predefined configuration;
outputting diffuse light from the optical diffuser in response to receiving the incident light when the incident light has a first set of properties, wherein the first set of properties includes a first polarization; and
transmitting the incident light in response to receiving the incident light when the incident light has a second set of properties, wherein the second set of properties includes a second polarization that is different from the first polarization.

13. The method of claim 12, wherein the optical diffuser has a first surface and a second surface opposite to the first surface, receiving incident light includes receiving the incident light at the first surface, and outputting diffuse light includes outputting, from the second surface, diffuse light having the second polarization.

14. The method of claim 12, wherein the optical diffuser has a first surface and a second surface opposite to the first surface, receiving incident light includes receiving the incident light at the first surface, and outputting diffuse light includes outputting, from the first surface, diffuse light having the first polarization.

15. The method of claim 12, wherein:
receiving the incident light includes receiving the incident light that is propagating in a first direction; and
outputting diffuse light includes diffusing the incident light such that the diffuse light propagates in a plurality of directions.

16. An optical diffuser, comprising:
optically anisotropic molecules arranged in a predefined configuration such that the optical diffuser outputs diffuse light upon receiving first light having a first polarization and transmits second light having a second polarization that is different from the first polarization upon receiving the second light, wherein:
the optical diffuser has a first surface and a second surface opposite to the first surface;
the first light is incident upon the first surface at an incident angle within a first predefined incident angle range; and
the optical diffuser is further configured to transmit third light that is incident upon either the first surface or the second surface at an angle that is outside of the first predefined incident angle range.

17. The optical diffuser of claim 16, further comprising:
a fourth surface proximate to the second surface; and
optically anisotropic molecules, disposed between the second surface and the fourth surface, arranged such that the optical diffuser diffuses seventh light as well as the first light and transmits eighth light as well as the second light, wherein
the seventh light an incident angle wavelength within a second predefined incident angle range that is different from the first predefined incident angle range;
the eighth light has an incident angle outside of the first predefined incident angle range and the second predefined incident angle range; and
the optical diffuser is configured to transmit the eighth light regardless of a polarization of the eighth light.

18. An optical diffuser, comprising:
optically anisotropic molecules arranged in a predefined configuration such that the optical diffuser outputs diffuse light upon receiving first light having a first polarization and transmits second light having a second polarization that is different from the first polarization upon receiving the second light, wherein the optically anisotropic molecules form a polarization sensitive hologram.

19. A method of making an optical diffuser, the method comprising:
illuminating optically anisotropic molecules with directional light having a first polarization; and
concurrently with illuminating the optically anisotropic molecules with the directional light, illuminating the optically anisotropic molecules with diffuse light having a second polarization that is different from the first polarization.

* * * * *